United States Patent
Likar et al.

(10) Patent No.: US 8,616,596 B2
(45) Date of Patent: Dec. 31, 2013

(54) FASTENING STRUCTURE FOR A BUMPER OF A MOTOR VEHICLE

(75) Inventors: Martin Likar, Ruesselsheim (DE); Theobald Hock, Grossostheim (DE); Fernando Soeiro, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 13/396,712

(22) Filed: Feb. 15, 2012

(65) Prior Publication Data

US 2012/0217763 A1 Aug. 30, 2012

(30) Foreign Application Priority Data

Feb. 26, 2011 (DE) .......................... 10 2011 012 530

(51) Int. Cl.
*B60R 19/04* (2006.01)
(52) U.S. Cl.
USPC ....................................................... 293/155
(58) Field of Classification Search
USPC ......... 293/155, 102, 115, 117, 118, 120, 121, 293/122, 126, 132, 133; 224/924, 158; 267/140; 362/505, 523, 549
See application file for complete search history.

(56) References Cited

U.S. PATENT DOCUMENTS

| | | | | |
|---|---|---|---|---|
| 2,181,245 A | * | 11/1939 | McIntyre | 293/136 |
| 2,258,453 A | * | 10/1941 | Johnson | 4/439 |
| 3,163,452 A | * | 12/1964 | Bryson et al. | 292/75 |
| 3,239,261 A | * | 3/1966 | Bryson et al. | 292/75 |
| 3,864,785 A | * | 2/1975 | Hoppock | 16/86 A |
| 3,969,786 A | * | 7/1976 | Peak | 16/86 A |
| 4,030,744 A | * | 6/1977 | Schwuchow et al. | 293/122 |
| 4,254,986 A | * | 3/1981 | Nakamura | 296/210 |
| 4,401,332 A | * | 8/1983 | Kimura et al. | 293/135 |
| 4,483,559 A | * | 11/1984 | Lewis et al. | 293/126 |
| 4,488,745 A | * | 12/1984 | Stokes | 293/155 |
| 4,597,153 A | * | 7/1986 | Zaydel | 29/434 |
| 4,721,333 A | * | 1/1988 | Morio | 293/146 |
| 4,917,426 A | * | 4/1990 | Copp | 293/142 |
| 4,960,235 A | * | 10/1990 | Gregory | 227/147 |
| 5,092,643 A | * | 3/1992 | Okamoto et al. | 293/155 |
| 5,098,765 A | * | 3/1992 | Bien | 428/134 |
| 5,169,189 A | * | 12/1992 | Haberle et al. | 293/102 |
| 5,249,836 A | * | 10/1993 | Stanesic et al. | 296/180.1 |
| 5,393,111 A | * | 2/1995 | Eipper et al. | 293/109 |

(Continued)

FOREIGN PATENT DOCUMENTS

| | | |
|---|---|---|
| DE | 10340153 A1 | 4/2005 |
| DE | 102006039685 A1 | 2/2008 |

(Continued)

OTHER PUBLICATIONS

UK IPO, British Search Report for Application No. 1201199.5, dated May 22, 2012.

(Continued)

*Primary Examiner* — Kiran B Patel
(74) *Attorney, Agent, or Firm* — Ingrassia Fisher & Lorenz, P.C.

(57) ABSTRACT

A bumper fastening structure is provided for a motor vehicle with a bumper and a fastening for the bumper, which has a screw and a screw cover. The bumper has at a fastening point a depression to receive a head of the screw and a recess for the mounting of the screw cover.

7 Claims, 4 Drawing Sheets

(56) References Cited

U.S. PATENT DOCUMENTS

| | | | |
|---|---|---|---|
| 5,800,188 A * | 9/1998 | Barber et al. | 439/142 |
| 6,010,169 A * | 1/2000 | Cox et al. | 293/120 |
| 6,113,084 A * | 9/2000 | Norkus et al. | 267/292 |
| 6,220,734 B1 * | 4/2001 | Muller | 362/520 |
| 6,279,974 B1 * | 8/2001 | McCormack | 293/128 |
| 6,314,633 B1 * | 11/2001 | Norkus et al. | 29/448 |
| 6,357,811 B1 * | 3/2002 | Nakamura et al. | 296/29 |
| 6,428,074 B1 * | 8/2002 | Sukegawa et al. | 296/29 |
| 6,669,274 B2 * | 12/2003 | Barnard et al. | 296/193.1 |
| 6,695,396 B1 * | 2/2004 | Schwab | 296/203.02 |
| 7,272,863 B2 * | 9/2007 | Pratt | 4/246.1 |
| 7,784,857 B2 * | 8/2010 | Naik et al. | 296/193.1 |
| 8,167,343 B2 * | 5/2012 | Ruder | 293/120 |
| 2013/0021814 A1 * | 1/2013 | Tanaka | 362/496 |

FOREIGN PATENT DOCUMENTS

| | | |
|---|---|---|
| DE | 102009011340 A1 | 10/2009 |
| FR | 2789956 A1 | 8/2000 |
| JP | 9123850 A | 5/1997 |
| JP | 9156434 A | 6/1997 |
| JP | 10081260 A1 | 3/1998 |
| JP | 11198746 A | 7/1999 |

OTHER PUBLICATIONS

German Patent Office, German Search Report for Application No. 102011012530.2, dated Dec. 8, 2011.

* cited by examiner

FASTENING STRUCTURE FOR A BUMPER OF A MOTOR VEHICLE

CROSS-REFERENCE TO RELATED APPLICATIONS

This application claims priority to German Application No. DE 10 2011 012 530.2, filed Feb. 26, 2011, which is hereby incorporated by referenced in its entirety.

TECHNICAL FIELD

The technical field relates to a fastening structure for a bumper of a motor vehicle, in particular of a rear bumper, in which the bumper is screwed to a body structure.

BACKGROUND

Numerous plastic parts are fastened to conventional motor vehicle bodies, for example bumpers, spoilers, grilles, interior lining, or a console. High demands are made here in particular on the bumpers, for example with regard to their fit and their stability. In the publication DE 10 2006 039 685 B4 it is proposed to fasten a bumper, including bumper covering, to a motor vehicle. In this arrangement, a vertical adjusting arrangement is provided that has a screw at least indirectly connected with the body, in order to adjust the bumper covering vertically, so that an independent adapting of the bumper covering to the body or respectively to a part connected to the body occurs independently of actual tolerance deviations.

It is at least one object to present a bumper fastening structure for a motor vehicle that improves connecting of the bumper onto the motor vehicle. In addition, other objects, desirable features, and characteristics will become apparent from the subsequent summary and detailed description, and the appended claims, taken in conjunction with the accompanying drawings and this background.

SUMMARY

According to an embodiment, a bumper fastening structure is provided for a motor vehicle with a bumper and a fastening for the bumper. The fastening for the bumper has a screw and a screw cover. At a fastening point, the bumper has a depression here to receive a head of the screw, and a recess for the mounting of the screw cover.

Such a bumper fastening structure has the advantage that through the robust screw fastening, an excessive deflection of the bumper and of a bumper covering, because of a considerable application of force, is avoidable. Such an application of force can occur for example on loading and unloading the vehicle, in particular in the region of a rear flap opening, if loading material or suchlike is supported accordingly on the bumper. In addition, the visual appearance of the bumper is improved because the screw head is covered by the screw cover and therefore is not visible externally.

The recesses can be constructed here as apertures in which the screw cover engages. It is known to use such engagement constructions in housings that have plastic parts, such as for example a bumper. Plastic parts have the advantage of elasticity, so that the spring deflections onto the engagement elements required by engagement elements can be distributed both on the one housing part and on the other housing part. The load for the individual engagement element of a respective engagement construction is thereby halved. In addition, such apertures can be formed simply and at a favorable cost in plastic parts, by for example an injection molding process, where no post-processing is necessary.

In an embodiment, the bumper is a front bumper. In addition, the bumper can, however, also be a rear bumper.

Consequently, a robust and visually attractive bumper fastening is ensured. Thus, through the simple and robust structure of the screw connection, the bumper is resistant to mechanical overloads. As a screw cover in addition, covers the screw head, the screw head is not visible externally, so that the visual appearance of the bumper is not impaired. In addition, however, a front bumper can also be connected to a motor vehicle with the bumper fastening structure.

The screw cover here can be produced from plastic. Preferably, the screw cover, which covers the screw head in a visually harmonious manner, is produced here from black solid-colored plastic, whereby the visual appearance of the bumper including the bumper fastening structure is improved, because the black screw cover, through the harmonious design, contributes to a good visual appearance of the bumper. In addition, the screw cover can have a grained surface. Hereby, it can be ensured that paint abrasion, for example in the region of a buffer of a rear flap opening, caused by relative movements between buffer and contact surface, does not become visually apparent.

In a further embodiment, the screw cover forms a contact surface for a buffer of the rear flap. In particular, in the region of the rear flap opening an excessive deflection of the bumper and of a bumper covering can occur because of a considerable application of force. Such an application of force can occur for example on loading and unloading the motor vehicle, if loading material or suchlike is accordingly supported on the bumper. In addition, because of relative movements between buffer and the contact surface, paint abrasion can occur, which impairs the visual appearance of the bumper and can ultimately lead to corrosion. Therefore, the stop surface for the flap buffer must not be produced from painted sheet metal, and must have a certain rigidity, which is ensured through the screw connection.

The recess can be constructed here such that a mounting direction of the screw cover runs perpendicularly to a loading direction of the buffer. Thereby, it can be ensured that also in the case of a load acting in the loading direction of the buffer, for example in the case of rapid, forceful closing of the rear flap, the screw cover cannot come loose, because the acting load is received completely through the contact surface. Thus, for example, apertures in which the screw cover engages can be constructed such that despite small engagement forces a robust contact surface is ensured in the loading direction. In addition, hereby the mounting of the screw cover is simplified and a defective mounting can be practically ruled out.

In summary, it is to be stated that a bumper fastening structure for a motor vehicle that is presented by means of which the connection of a bumper to the motor vehicle is improved. Thus, through the screw connection, the connection of the bumper to the motor vehicle can be constructed in a robust manner. In addition, the connection through the screw connection is held in a robust manner, and the visual appearance of the bumper is improved because the screw head is covered by the screw cover and therefore is not visible externally.

In addition, a robust and visually attractive rear bumper fastening can be ensured, in particular in the region of a rear flap opening. Here, the screw cover can form a stop surface for a buffer of the rear flap opening. The visual appearance of the bumper, including the bumper fastening structure can be improved here, by the screw cover being produced from black solid-colored plastic. In addition, it can be prevented that paint abrasion, caused by relative movements between buffer and contact surface, becomes visible, as soon as the screw cover has a grained surface. If the recess for the screw cover is constructed such that a mounting direction of the screw cover runs perpendicularly to a loading direction of the buffer, in addition also a load acting in the loading direction, for example by rapid, forceful closing of the rear flap, can be received completely through the bearing surface. For example, on engagement of the screw cover, hereby a robust contact surface is ensured in the direction of movement, despite small engagement forces.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
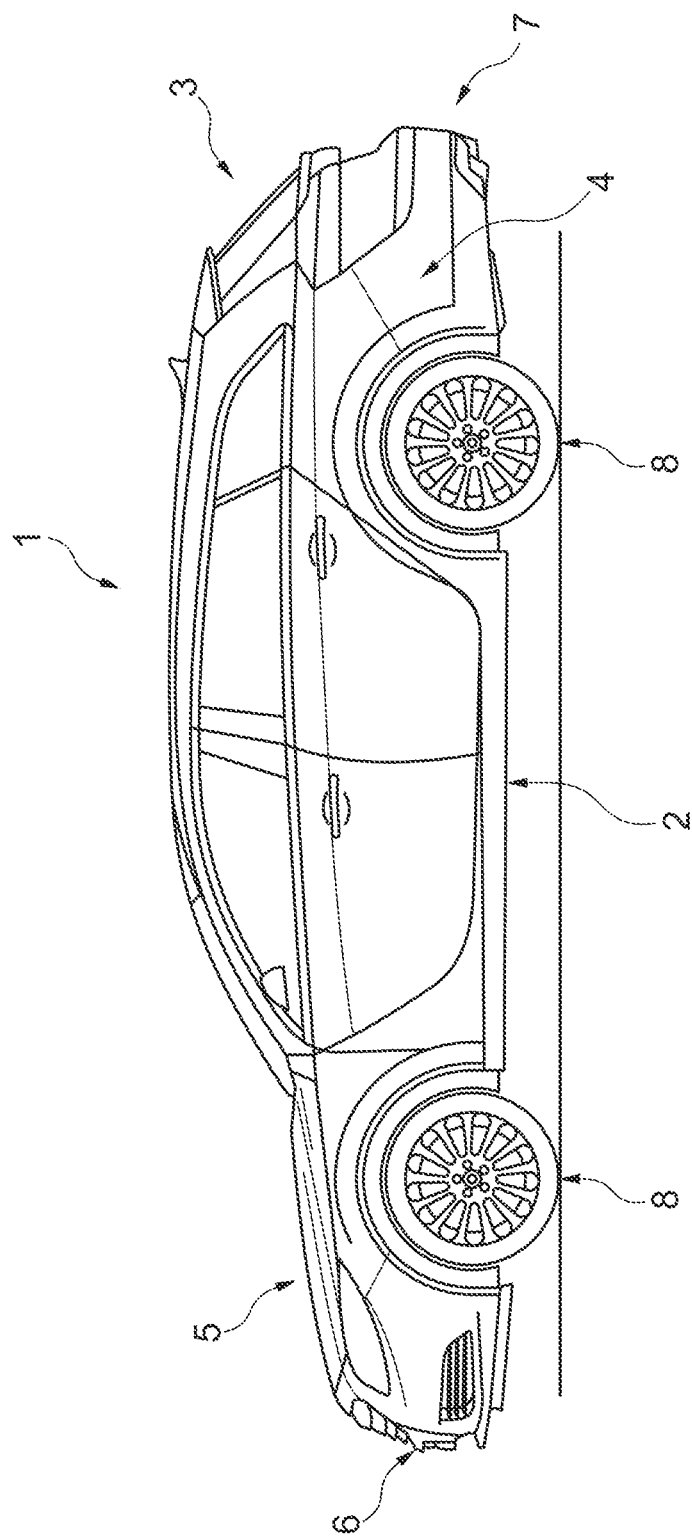
FIG. 1 shows a diagrammatically perspective side view of a motor vehicle.

FIG. 1 shows a diagrammatically perspective side view of a motor vehicle 1. As FIG. 1 shows, the body 2 of the motor vehicle 1 has a rear flap 3, which runs between respective wings and/or side panel frames 4 of the body 2. In addition, a front bumper 6 arranged beneath an engine hood 5 of the motor vehicle 1 can be seen, and a rear bumper 7, running parallel to, beneath the rear flap 3, and between the side panel frames 4. Here, beneath means in the direction of the wheels of the motor vehicle 1. The rear bumper 7 is fastened to the motor vehicle here via a bumper fastening structure 9, which is shown in FIG. 2 to FIG. 4.

Figure 2:
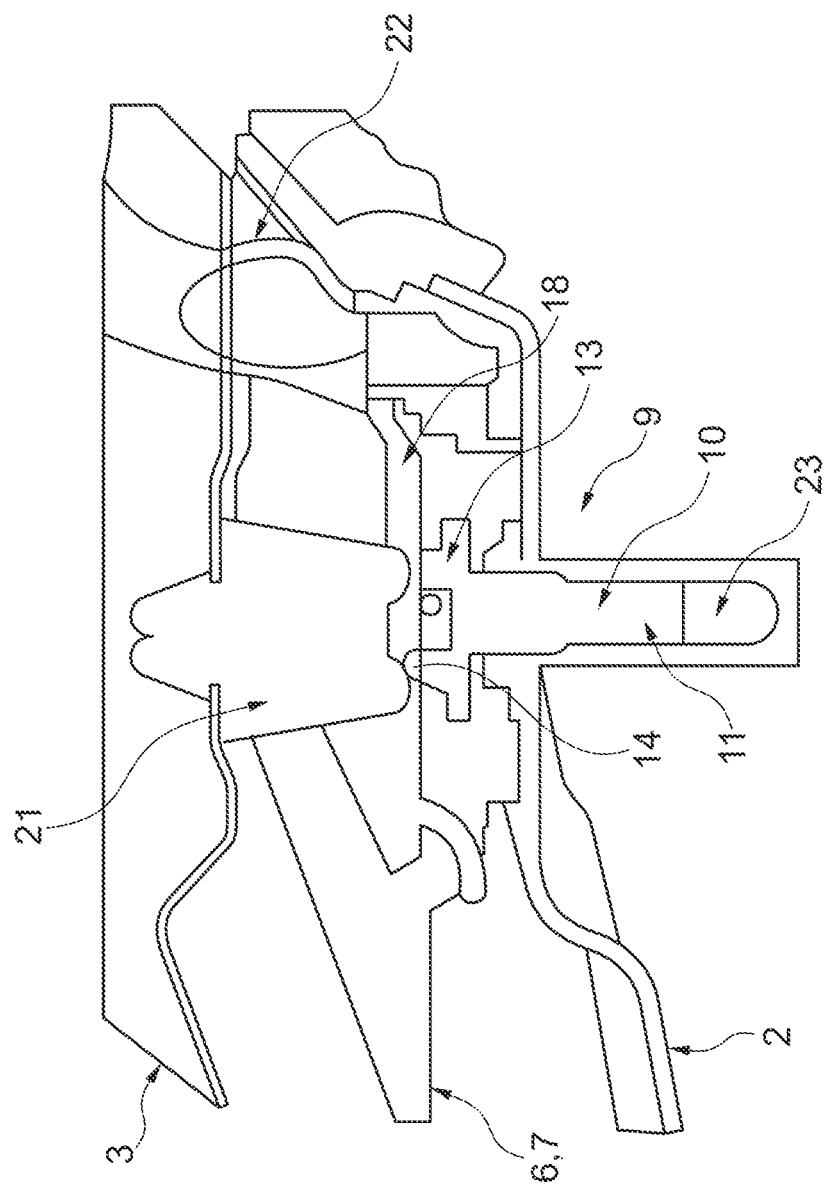
FIG. 2 shows a diagrammatically perspective cross-sectional view of a bumper fastening structure according to an embodiment, with screw cover.
Figure 3:
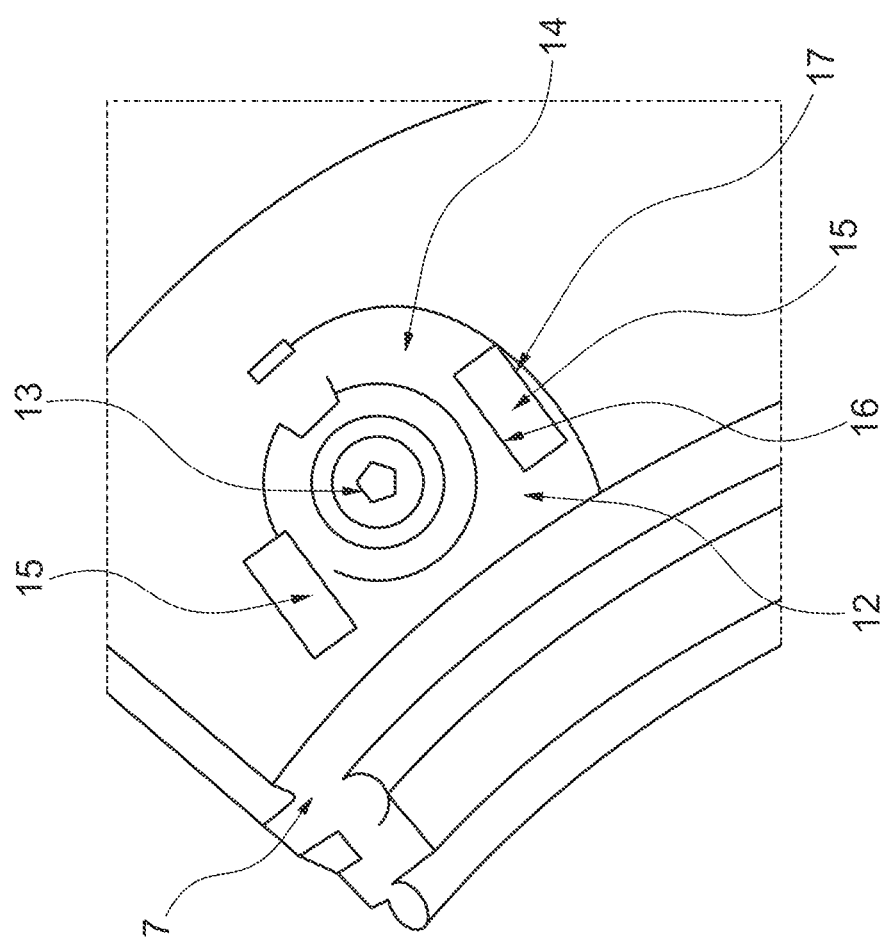
FIG. 3 shows a diagrammatically perspective top view onto the bumper fastening structure according to the example embodiment of FIG. 2, without screw cover.
Figure 4:
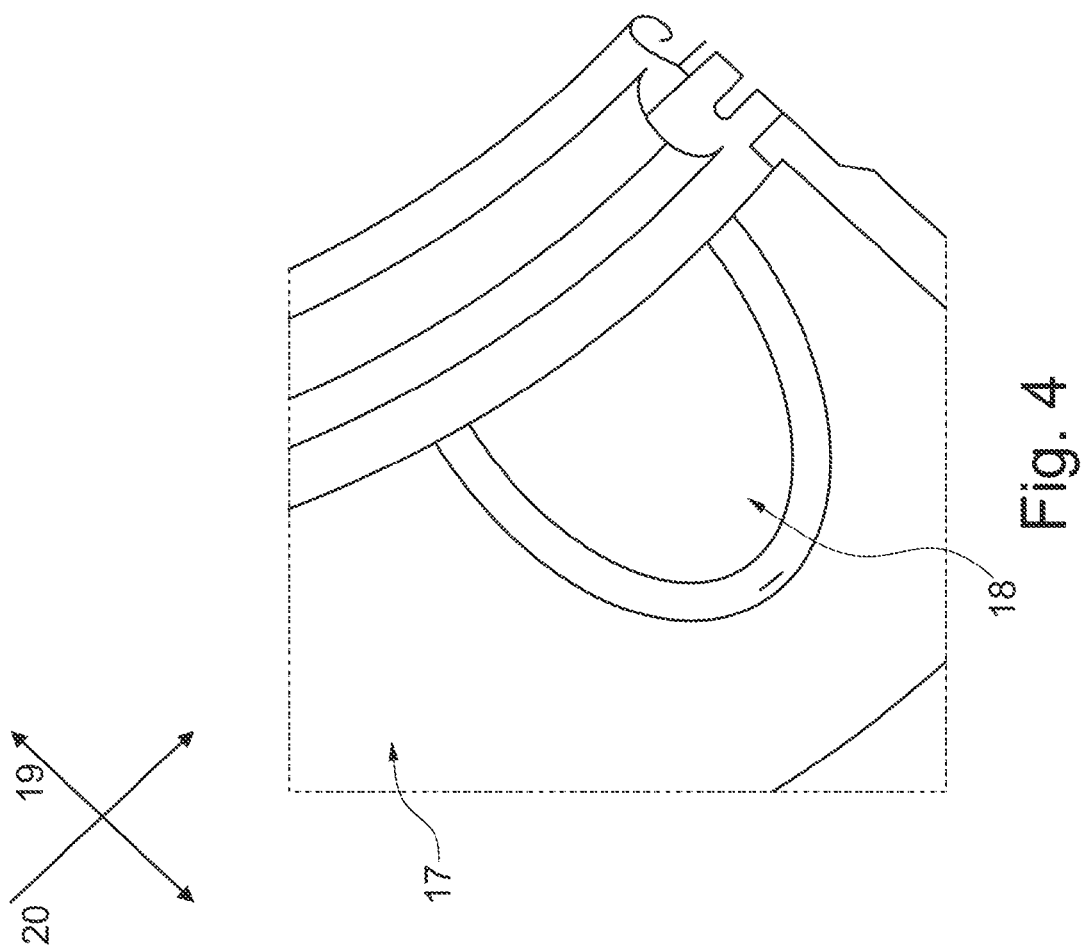
FIG. 4 shows a diagrammatically perspective top view onto the bumper fastening structure according to the example embodiment of FIG. 2, with screw cover.

FIG. 2 and FIG. 3 show diagrammatically perspective views of a bumper fastening structure 9 according to an embodiment, in cross-section with screw cover (FIG. 2) and as a top view without screw cover (FIG. 3). In each case, a fastening means 10 can be seen for the bumper 6, 7, which has a screw 11 and a screw cover 18. As FIG. 2 shows, the bumper 6, 7 has a depression 12 here to receive a head 13 of the screw 11, and a recess 14 for the mounting of the screw cover 18. In the example embodiment, which is shown, the screw is held in a rivet nut 23.

As FIG. 3 shows, the screw head 13 is therefore arranged through the depression 12 in an integrated manner into the bumper 6, 7, where the risk of injury in the case of an impact of the motor vehicle with a pedestrian can be reduced. In the example embodiment, which is shown, the recesses 14 for the mounting of the screw cover are constructed here as apertures 15, in which the screw cover engages. As FIG. 3 shows, the apertures 15 here have a first wall section 16 and a second wall section 17, between which the screw cover is held in an engaged manner.

The bumper 6, 7 here is a rear bumper 7. In addition, however, a front bumper 6 can also be connected to the motor vehicle 1 via the bumper fastening structure 9.

As can be seen in FIG. 2, the screw cover here can form a stop surface for a buffer 21 of a rear flap 3. The rear flap 3 is connected here via a seal 22 to the rear bumper 7. FIG. 4 shows a diagrammatically perspective top view onto a bumper fastening structure 9 according to the example embodiment of FIG. 2, with screw cover 18. It can be seen here that the screw cover 18 engages in the apertures 15 and therefore covers the screw head 13 in a visually harmonious manner.

The screw cover 18, which is shown can also be produced from black solid-colored plastic and therefore have the same color as the bumper 7, where the visual appearance of the bumper 7 including the bumper fastening structure 9 is improved. In addition, FIG. 4 shows that the recesses 14 are constructed in such a way so that the mounting direction of the screw cover 18 runs perpendicularly to the loading direction of a buffer of the rear flap 3. The mounting direction of the screw cover 18 is symbolized here by the arrow, provided with reference number 19. The loading direction of the buffer in turn is symbolized by the arrow provided with the reference number 20. The screw cover 18 therefore forms a robust contact surface in the loading direction, because also in the case of a load acting in the loading direction, for example by the application of force on the loading and unloading of the luggage trunk of the motor vehicle 1, the acting load is received completely though the bearing surface.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A bumper fastening structure for a motor vehicle, comprising:
   a bumper;
   a screw; and
   a screw cover covering the screw,
   wherein the bumper comprises a depression at a fastening point that is configured to receive a head of the screw and a recess configured to mount the screw cover, wherein the recess comprises a first wall and a second wall and the screw cover is configured to attach to the recess via the first wall and second wall.

2. The bumper fastening structure according to claim 1, wherein the bumper is a front bumper.

3. The bumper fastening structure according to claim 1, wherein the bumper is a rear bumper.

4. The bumper fastening structure according to claim 1, wherein the screw cover is at least partially formed from a plastic.

5. The bumper fastening structure according to claim 1, wherein the screw cover comprises a grained surface.

6. The bumper fastening structure according to claim 3, wherein the screw cover is configured to form a stop surface for a buffer of a rear flap.

7. The bumper fastening structure according to claim 6, wherein the recess is constructed such that a mounting direction of the screw cover is configured to run substantially perpendicularly to a loading direction of the buffer.

* * * * *